United States Patent
Takeuchi et al.

(10) Patent No.: US 10,957,930 B2
(45) Date of Patent: Mar. 23, 2021

(54) SOLID ALKALINE FUEL CELL INCLUDING INORGANIC SOLID ELECTROLYTE ENABLED TO PERMEATE WATER

(71) Applicant: NGK INSULATORS, LTD., Nagoya (JP)

(72) Inventors: Yukihisa Takeuchi, Nagoya (JP); Hirofumi Kan, Nagoya (JP); Toshiyuki Nakamura, Handa (JP); Makoto Ohmori, Nagoya (JP)

(73) Assignee: NGK INSULATORS, LTD.

( * ) Notice: Subject to any disclaimer, the term of this patent is extended or adjusted under 35 U.S.C. 154(b) by 73 days.

(21) Appl. No.: 16/295,456

(22) Filed: Mar. 7, 2019

(65) Prior Publication Data

US 2019/0207237 A1    Jul. 4, 2019

Related U.S. Application Data

(63) Continuation of application No. PCT/JP2018/046386, filed on Dec. 17, 2018.

(30) Foreign Application Priority Data

Dec. 18, 2017 (JP) .............................. JP2017-241273

(51) Int. Cl.
    *H01M 8/083*    (2016.01)
    *H01M 8/02*    (2016.01)
    (Continued)

(52) U.S. Cl.
    CPC ............. *H01M 8/083* (2013.01); *H01M 8/02* (2013.01); *H01M 8/04186* (2013.01);
    (Continued)

(58) Field of Classification Search
    CPC .... H01M 8/083; H01M 8/02; H01M 8/04186; H01M 8/1009; H01M 8/1011; H01M 8/1016; H01M 8/24
    (Continued)

(56) References Cited

U.S. PATENT DOCUMENTS

| 2015/0303337 A1 | 10/2015 | Ishii et al. |
| 2015/0340680 A1 | 11/2015 | Fujisaki et al. |
| 2016/0159659 A1* | 6/2016 | Zhang ............... C01F 7/005 |
| | | 423/395 |

FOREIGN PATENT DOCUMENTS

| DE | 112014003397 T5 | 5/2016 |
| JP | 2004-296274 A | 10/2004 |

(Continued)

OTHER PUBLICATIONS

German Office Action for corresponding application No. 11 2018 000 115.6, dated Dec. 11, 2019, including partial English translation thereof (7 pages).

(Continued)

*Primary Examiner* — Sean P Cullen
(74) *Attorney, Agent, or Firm* — Flynn Thiel, P.C.

(57) ABSTRACT

A solid alkaline fuel cell has a cathode that is supplied with an oxidant which contains oxygen, an anode that is supplied with a fuel which contains hydrogen atoms, and an inorganic solid electrolyte that is disposed between the anode and the cathode and that exhibits a hydroxide ion conductivity. The inorganic solid electrolyte enables the permeation of water of greater than or equal to 80 µg/min·cm$^2$ and less than or equal to 5400 µg/min·cm$^2$ per unit surface area of a cathode-side surface.

3 Claims, 2 Drawing Sheets

(51) Int. Cl.
*H01M 8/24* (2016.01)
*H01M 8/1016* (2016.01)
*H01M 8/1009* (2016.01)
*H01M 8/04186* (2016.01)
*H01M 8/1011* (2016.01)

(52) U.S. Cl.
CPC ....... *H01M 8/1009* (2013.01); *H01M 8/1011* (2013.01); *H01M 8/1016* (2013.01); *H01M 8/24* (2013.01); *H01M 2300/0068* (2013.01)

(58) Field of Classification Search
USPC ........................................................ 429/491
See application file for complete search history.

(56) References Cited

FOREIGN PATENT DOCUMENTS

| JP | 2004296274 A | * | 10/2004 |
| JP | 2007-277078 A | | 10/2007 |
| JP | 2009-140701 A | | 6/2009 |
| JP | 2013-045701 A | | 3/2013 |
| JP | 2016-071948 A | | 5/2016 |
| WO | 2010/109670 A1 | | 9/2010 |

OTHER PUBLICATIONS

English language International Search Report for corresponding PCT/JP2018/046386 (1 page).

English translation of International Preliminary Report on Patentability and Written Opinion of the International Searching Authority, issued in corresponding International Application No. PCT/JP2018/046386, Date of Issuance Jun. 23, 2020 (7 pages).

Japanese International Search Report for corresponding PCT/JP2018/046386 and the Written Opinion of the International Searching Authority dated Feb. 19, 2019 (9 pages).

* cited by examiner

SOLID ALKALINE FUEL CELL INCLUDING INORGANIC SOLID ELECTROLYTE ENABLED TO PERMEATE WATER

CROSS-REFERENCE TO RELATED APPLICATIONS

This is a continuation application of PCT/JP2018/046386, filed Dec. 17, 2018, which claims priority to Japanese Application No. 2017-241273, filed Dec. 18, 2017, the entire contents of which are hereby incorporated by reference.

TECHNICAL FIELD

The present invention relates to a solid alkaline fuel cell.

BACKGROUND ART

Alkaline fuel cells (AFC) are known as a fuel cell that operates at a relatively low temperature (for example, less than or equal to 250 degrees C.). Various liquid fuels or gaseous fuels can be used in an AFC and for example, use of methanol as a fuel causes the following electrochemical reaction.

Anode $CH_3OH + 6OH^- \rightarrow 6e^- + CO_2 + 5H_2O$
Cathode $3/2O_2 + 3H_2O + 6e^- \rightarrow 6OH^-$
Overall: $CH_3OH + 3/2O_2 \rightarrow CO_2 + 2H_2O$ In this context, Japanese Patent Application Laid-Open No. 2016-071948 proposes a solid alkaline fuel cell in which an inorganic solid electrolyte that exhibits a hydroxide ion conductivity is configured as a layered double hydroxide (LDH) that does not exhibit a liquid permeability and gas permeability.

LDH is expressed by the general formula $[M^{2+}_{1-x}M^{3+}_{x}(OH)_2][A^{n-}_{x/n} \cdot mH_2O]$ (wherein $M^{2+}$ is a divalent cation, $M^{3+}$ is a trivalent cation, and $A^{n-}$ is an n-valent anion).

SUMMARY OF INVENTION

As shown by the above reaction formula, since a solid alkaline fuel cell consumes both oxygen ($O_2$) and water ($H_2O$) at the cathode, the cathode must be supplied with an oxidant that includes oxygen and water (for example, humidified air).

However, supplying the cathode with an oxidant that contains water requires not only equipment for humidifying the oxidant (for example, a humidifier, a water tank or the like) but also consumes the energy for humidifying the oxidant.

For this reason, there is a need for a new approach for the efficient supply of water to the cathode.

The present invention has the object of providing a solid alkaline fuel cell that enables the efficient supply of water to the cathode.

The solid alkaline fuel cell according to the present invention comprises a cathode that is supplied with an oxidant which contains oxygen, an anode that is supplied with a fuel which contains hydrogen atoms, and an inorganic solid electrolyte that is disposed between the anode and the cathode and that exhibits hydroxide ion conductivity. The inorganic solid electrolyte enables the permeation of water of greater than or equal to 80 μg/min·cm² and less than or equal to 5400 μg/min·cm² per unit surface area of a cathode-side surface.

The present invention provides a solid alkaline fuel cell that enables the efficient supply of water to the cathode.

DESCRIPTION OF EMBODIMENTS

Solid Alkaline Fuel Cell 10

A solid alkaline fuel cell 10 is a type of alkaline fuel cell (AFC) that operates at a relatively low temperature. The operation temperature of the solid alkaline fuel cell 10 according to the present embodiment is 50 degrees C. to 250 degrees C. The solid alkaline fuel cell 10 operates for example with methanol and generates power with the electrochemical reaction below.

Figure 1:
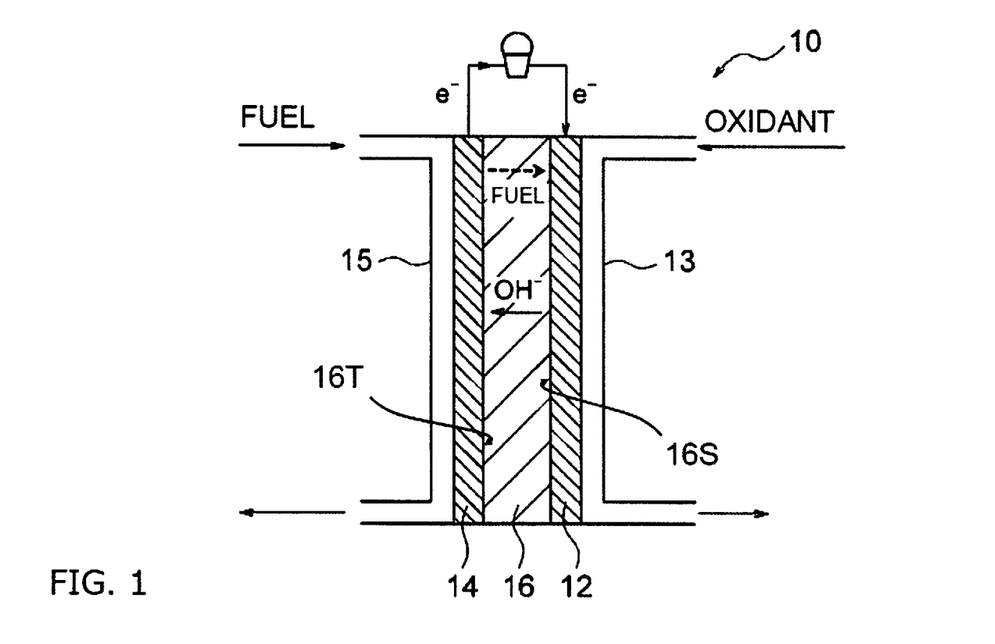
FIG. 1 is a cross sectional view illustrating a schematic configuration of a solid alkaline fuel cell.

Cathode 12: $3/2O_2 + 3H_2O + 6e^- \rightarrow 6OH^-$
Anode 14: $CH_3OH + 6OH^- \rightarrow 6e^- + CO_2 + 5H_2O$
Overall: $CH_3OH + 3/2O_2 \rightarrow CO_2 + 2H_2O$ FIG. 1 is a cross sectional view illustrating a schematic configuration of the solid alkaline fuel cell 10. The solid alkaline fuel cell 10 includes a cathode 12, an anode 14, and an inorganic solid electrolyte 16.

The cathode 12 is a positive electrode that is generally termed the air electrode. During power generation by the solid alkaline fuel cell 10, an oxidant supply means 13 supplies the cathode 12 with an oxidant that includes oxygen ($O_2$). The oxidant may include use of air.

In this context, the inorganic solid electrolyte 16 according to the present embodiment is configured to enable permeation (cross-over) towards the cathode 12 of a portion of the water that is produced from the fuel as a result of the electrochemical reaction at the anode 14 as described above. The water that has permeated to the cathode 12 through the inorganic solid electrolyte 16 is used in the electrochemical reaction at the cathode 12 as described above.

When the entire amount of water that is required for the electrochemical reaction at the cathode 12 permeates through the inorganic solid electrolyte 16 from the anode 14 to the cathode 12, the oxidant that is supplied to the cathode 12 may substantially omit the water content. In this configuration, there is no requirement to provide equipment (for example, a humidifier, water tank, or the like) to humidify the oxidant, and furthermore, there is no energy consumed in humidifying the oxidant.

On the other hand, when only a portion of the water that is required for the electrochemical reaction at the cathode 12 permeates through the inorganic solid electrolyte 16 from the anode 14 to the cathode 12, the oxidant that is supplied to the cathode 12 preferably includes water. In this configuration, although there is a requirement to provide equipment for humidifying the oxidant, the equipment may be downscaled to thereby reduce the energy consumed in humidifying the oxidant. It is noted that humidified air is suitable as an oxidant that includes oxygen and water.

The term "water ($H_2O$)" as used in the specification may denote water vapor in a gaseous state, moisture in a liquid state, and a gas-liquid mixture of water vapor and moisture.

The cathode 12 may be configured to include a known cathode catalyst that is used in an alkaline fuel cell, but there is no limitation in this regard. An example of a cathode catalyst includes a group 8 to 10 element (an element that belongs to groups 8 to 10 in the IUPAC format periodic table) such as a platinum group element (Ru, Rh, Pd, Os, Ir, Pt), an iron group element (Fe, Co, Ni), or the like, a group 11 element (an element that belongs to group 11 in the IUPAC format periodic table) such as Cu, Ag, Au, or the like, rhodium phthalocyanine, tetraphenylporphyrin, Co salen, Ni salen (salen=N,N'-bis (salicylidene) ethylenediamine), silver nitrate, and arbitrary combinations thereof. Although there is no particular limitation in relation to the amount of supported catalyst in the cathode 12, a value of 0.1 to 10 mg/cm² is preferred, and 0.1 to 5 mg/cm² being more preferred. It is preferred that the cathode catalyst is supported on carbon. A preferred example of the cathode 12 or a catalyst that used to configure the cathode 12 includes platinum-supporting carbon (Pt/C), paladium-supporting carbon (Pd/C), rhodium-supporting carbon (Rh/C), nickel-supporting carbon (Ni/C), copper-supporting carbon (Cu/C) and silver-supporting carbon (Ag/C).

Although there is no particular limitation in relation to the method of preparation for the cathode 12, for example, it may be formed by mixing a cathode catalyst with a support and a binder as desired to form a paste, and coating the paste mixture onto one surface of the inorganic solid electrolyte 16.

The anode 14 is a negative electrode that is generally termed the fuel electrode. During power generation by the solid alkaline fuel cell 10, a fuel supply means 15 supplies the anode 14 with a fuel that includes hydrogen atoms (H). A fuel that contains hydrogen atoms can react with hydroxide ions ($OH^-$) at the anode 14 to thereby enable the production of water.

This type of fuel may be configured as either a liquid fuel or gaseous fuel. A liquid fuel may be a liquid of a fuel compound itself, or may be a solid fuel compound that has been dissolved in a liquid such as water, alcohol, or the like.

For example, the fuel compound includes (i) types of hydrazines such as hydrazine ($NH_2NH_2$), hydrated hydrazine ($NH_2NH_2.H_2O$), hydrazine carbonate (($NH_2NH_2)_2CO_2$), hydrazine sulfate ($NH_2NH_2.H_2SO_4$), monomethyl hydrazine ($CH_3NHNH_2$), dimethyl hydrazine (($CH_3)_2NNH_2$, $CH_3NHNHCH_3$) and carboxylic hydrazide (($NHNH_2)_2CO$), or the like, (ii) urea ($NH_2CONH_2$), (iii) ammonia ($NH_3$), (iv) heterocyclic compounds such as imidazole, 1,3,5-triazine, 3-amino-1,2,4-triazole, or the like, and (v) hydroxylamines such as hydroxylamine ($NH_2OH$), hydroxylamine sulfate ($NH_2OH.H_2SO_4$), or the like, and combinations thereof.

Those compounds of the above fuel compounds that do not contain carbon (that is to say, hydrazine, hydrated hydrazine, hydrazine sulfate, ammonia, hydroxylamine, hydroxylamine sulfate, or the like) not only enable an enhanced durability by avoiding any problems associated with catalyst poisoning by carbon monoxide, but also avoid carbon dioxide emissions.

The fuel compound may be used without modification as a fuel or may be used as a solution by dissolving it in water and/or alcohol (for example, a lower alcohol such as methanol, ethanol, propanol, isopropanol, or the like). For example, since fuel compounds such as hydrazine, hydrated hydrazine, monomethyl hydrazine and dimethyl hydrazine are in a liquid state, use is possible as a liquid fuel without modification. Furthermore, solids such as hydrazine carbonate, hydrazine sulfate, carboxylic hydrazide, urea, imidazole, 3-amino-1,2,4-triazole and hydroxylamine sulfate can be dissolved in water. Solids such as 1,3,5-triazine and hydroxylamine can be dissolved in an alcohol. A gas such as ammonia can be dissolved in water. In this manner, solid fuel compounds can be used as a liquid fuel by dissolution in water or alcohol. When using a fuel compound by dissolution in water and/or alcohol, the concentration of the fuel compound in solution for example is 1 to 90 wt % and is preferably 1 to 30 wt %.

Furthermore, hydrocarbon liquid fuels that include types of ethers or types of alcohol such as methanol, ethanol, or the like, hydrocarbon gases such as methane or the like, or pure hydrogen or the like may be used as a fuel without modification. In particular, methanol is suitable as a fuel for use in the solid alkaline fuel cell 10 according to the present embodiment. Methanol may be in gaseous state, liquid state or as a gas-liquid mixture.

Although the anode 14 may be configured to include a known anode catalyst that is used in an alkaline fuel cell, there is no particular limitation in this regard. An example of an anode catalyst includes a metal catalyst such as Pt, Ni, Co, Fe, Ru, Sn and Pd or the like. Although it is preferred that a metal catalyst is supported on a support such as carbon or the like, it may be configured as an organometal complex using the metal atoms of the metal catalyst as the central metal, or supported by the use of such an organometal complex as a support. Furthermore, a diffusion layer that is configured using a porous material or the like may be disposed on a surface of the anode catalyst. Preferred examples of the anode 14 or the catalyst that is used to configure the anode include nickel, cobalt, silver, platinum supporting carbon (Pt/C), palladium supporting carbon (Pd/C), rhodium supporting carbon (Rh/C), nickel supporting carbon (Ni/C), copper supporting carbon (Cu/C) and silver supporting carbon (Ag/C).

Although there is no particular limitation in relation to the method of preparation for the anode 14, for example, it may be formed by mixing an anode catalyst with a support and a binder as desired to form a paste, and coating the paste mixture onto the surface of the inorganic solid electrolyte 16 that is opposite to the cathode 12.

The inorganic solid electrolyte 16 is disposed between the cathode 12 and the anode 14. The inorganic solid electrolyte 16 includes a cathode-side surface 16S and an anode-side surface 16T. The cathode-side surface 16S is a region in the outer surface of the inorganic solid electrolyte 16 that is exposed in a space in which the cathode 12 is disposed, and faces the cathode 12. The anode-side surface 16T is a region in the outer surface of the inorganic solid electrolyte 16 that is exposed in a space in which the anode 14 is disposed, and faces the anode 14.

The inorganic solid electrolyte 16 is a ceramic that exhibits a hydroxide ion conductivity. The higher the hydroxide ion conductivity in the inorganic solid electrolyte 16, the more such a configuration is preferred and it is typically configured as $10^{-4}$ to $10^{-1}$ S/m.

The inorganic solid electrolyte 16 may be configured as a layered double hydroxide (referred to below as "LDH"). In such a configuration, the inorganic solid electrolyte 16 exhibits a superior heat resistance and durability when compared with a configuration in which an organic material such as an AEM (anion exchange membrane) is used as an electrolyte.

LDH has a basic composition that is expressed by the general formula of $[M^{2+}_{1-x}M^{3+}_x(OH)_2][A^{n-}_{x/n}.mH_2O]$ (wherein $M^{2+}$ is a divalent cation, $M^{3+}$ is a trivalent cation, and $A^{n-}$ is an n-valent anion, n is an integer that is greater than or equal to 1, and x takes a value of 0.1 to 0.4).

In the general formula above, although $M^{2+}$ may be an arbitrary divalent cation, it preferably includes $Mg^{2+}$, $Ca^{2+}$, and $Zn^{2+}$, and more preferably is $Mg^{2+}$. $M^{3+}$ may be an arbitrary trivalent cation, preferably includes $Al^{3+}$ or $Cr^{3+}$, and more preferably is $Al^{3+}$. $A^{n-}$ is an arbitrary anion, preferably includes $OH^-$ and $CO_3^{2-}$.

Therefore, in the general formula above, it is particularly preferred that $M^{2+}$ includes $Mg^{2+}$, $M^{3+}$ includes $Al^{3+}$ and $A^{n-}$ includes $OH^-$ and $CO_3^{2-}$. Although n is an integer that is greater than or equal to 1, it preferably takes a value of 1 or 2. Although x takes a value of 0.1 to 0.4, it preferably takes a value of 0.2 to 0.35. An arbitrary real number is denoted by m.

Furthermore, a portion or all of $M^{3+}$ in the general formula above may be substituted by cations having a valency of 4 or more, and in that configuration, the coefficient x/n of the anion $A^{n-}$ in the general formula may be suitably varied.

The inorganic solid electrolyte 16 in the present embodiment is configured to enable permeation towards the cathode 12 of a portion of the water that is produced from the fuel as a result of the electrochemical reaction at the anode 14. The water permeation characteristics of the inorganic solid electrolyte 16 (that is to say, the degree to which water is allowed to permeate) can be defined with reference to the water permeation amount per unit surface area of the cathode-side surface 16S.

More specifically, the inorganic solid electrolyte 16 enables the permeation of water that is greater than or equal to 80 μg/min·cm² and less than or equal to 5400 μg/min·cm² per unit surface area of the cathode-side surface 16S. In this manner, water can be efficiently supplied through the inorganic solid electrolyte 16 to the cathode 12.

Since a configuration in which the water permeation amount per unit surface area is greater than or equal to 80 μg/min cm² supplies the cathode 12 with water that has permeated through the inorganic solid electrolyte 16, when generating power at a rated load (0.3 A/cm², air utilization rate Ua 50%), the output of the solid alkaline fuel cell 10 can be inhibited from falling even when the output of the humidifier is reduced (or stopped). Furthermore, a configuration in which the water permeation amount per unit surface area is less than or equal to 5400 μg/min·cm² inhibits an adverse effect on the characteristics of the inorganic solid electrolyte 16 and therefore when generating power at a rated load, inhibits a reduction in the output of the solid alkaline fuel cell 10.

In addition, when generating power at a rated load, a configuration in which the water permeation amount per unit surface area is greater than or equal to 320 μg/min cm², or furthermore a configuration in which the water permeation amount per unit surface area is greater than or equal to 1300 μg/min·cm² inhibits a reduction in the output of the solid alkaline fuel cell 10 even when the output of the humidifier is reduced (or stopped).

Furthermore, a configuration in which the water permeation amount per unit surface area is less than or equal to 5000 μg/min·cm², or furthermore a configuration in which the water permeation amount per unit surface area is less than or equal to 4000 μg/min·cm² enables the further inhibition of an adverse effect on the characteristics of the inorganic solid electrolyte 16 and therefore when generating power at a rated load, inhibits a reduction in the output of the solid alkaline fuel cell 10.

The water permeation amount per unit surface area of the cathode-side surface 16S is obtained in the following manner. Firstly, the cathode 12, anode 14 and inorganic solid electrolyte 16 are removed from a completed solid alkaline fuel cell 10. Then, the inorganic solid electrolyte 16 is configured as a single unit by removal of the cathode 12 and the anode 14. Next, water vapor at 22 kPa and 62 degrees C. is supplied to the anode-side surface 16T of the inorganic solid electrolyte 16 while circulating nitrogen gas that does not contain water onto the cathode-side surface 16S. Then, the total amount of nitrogen gas (including water vapor) that has permeated the cathode-side surface 16S is recovered and cooled to 0 degrees C. to thereby separate the water vapor contained in the nitrogen gas as liquid water. The mass of the separated water is divided by the test time and the surface area of the cathode-side surface 16S to thereby calculate the water permeation amount per unit surface area of the cathode-side surface 16S.

A fuel permeation function may be imparted to the inorganic solid electrolyte 16 for example by adopting any of a first method, a second method, or a combination of the first method and second method as described below.

The first method of imparting a fuel permeation function is a method of providing through holes in the inorganic solid electrolyte 16. The through holes are produced by piercing an inner portion of the inorganic solid electrolyte 16 from the anode-side surface 16T to the cathode-side surface 16S. The inner diameter and number of through holes may be suitably set to thereby produce a water permeation that is greater than or equal to 80 μg/min·cm² and less than or equal to 5400 μg/min·cm² per unit surface area of the cathode-side surface 16S. The through holes are preferably disposed in proximity to the supply port of the oxidant supply means 13 in the inorganic solid electrolyte 16. In this manner, water that has flowed from the through holes to the cathode 12 can be transferred with the oxidant to the whole cathode 12.

The second method of imparting a fuel permeation function is a method of providing pores in the inorganic solid electrolyte 16. It is preferred that the pores are formed to connect an inner portion of the inorganic solid electrolyte 16 from the anode-side surface 16T to the cathode-side surface 16S. There is no particular limitation on the shape of the pores, and they may be configured with an irregular shape, or as a mesh or the like. The pores may be formed throughout the inorganic solid electrolyte 16, or may be formed only in a portion of the inorganic solid electrolyte 16. The inner diameter, length and number of the pores may be suitably set to thereby produce a water permeation that is greater than or equal to 80 μg/min·cm² and less than or equal to 5400 μg/min·cm² per unit surface area of the cathode-side surface 16S.

However, when a substrate as described below is included in the inorganic solid electrolyte 16, the second method can only be used when the substrate is configured using a material that can withstand the firing temperature (for example, greater than or equal to 400 degrees C.). The method of manufacturing the inorganic solid electrolyte 16 will be described below.

Although the inorganic solid electrolyte 16 may be configured only by the use of a particle group that contains an inorganic solid electrolytic substance that exhibits a hydroxide ion conductivity, an additive component to assist in the density or hardness of that particle group may also be included.

The inorganic solid electrolyte 16 may be configured as a complex using a substrate formed as a porous body that exhibits an open pore configuration and an inorganic solid electrolytic substance (for example, LDH) that is precipitated and grown into the pores to thereby fill the pores of the porous body. The porous body may be configured by a ceramic material such as alumina, zirconia or the like or an insulating material such as a porous sheet or the like that is formed from a foam resin or fibrous substance.

The inorganic solid electrolyte 16 may be configured in any of a plate shape, membrane shape or stacked shape. When the inorganic solid electrolyte 16 has a membrane or stacked shape, the membrane or stacked shaped inorganic solid electrolytic substance of the inorganic solid electrolyte 16 may be formed in the porous substrate or on the porous substrate. When the inorganic solid electrolyte 16 has a membrane or stacked shape, the thickness of the inorganic solid electrolyte 16 may be configured as less than or equal to 100 μm, preferably less than or equal to 75 μm, more preferably less than or equal to 50 μm, still more preferably less than or equal to 25 μm, and particularly more preferably less than or equal to 5 μm. The resistance of the inorganic solid electrolyte 16 decreases as the thickness of the inorganic solid electrolyte 16 is reduced. The lower limiting value of the thickness of the inorganic solid electrolyte 16 may be set with reference to a given use, but is preferably greater than or equal to 1 μm and more preferably greater than or equal to 2 μm in order to maintain a certain degree of rigidity. When the inorganic solid electrolyte 16 has a plate shape, the thickness of the inorganic solid electrolyte 16 may be configured as 0.01 to 0.5 mm, preferably 0.02 to 0.2 mm, and more preferably 0.05 to 0.1 mm.

Method of Manufacturing Inorganic Solid Electrolyte 16

An example of a method of manufacturing an inorganic solid electrolyte 16 will be described. The method of manufacture in the following description is performed by molding and firing an LDH powder of LDH that is typically hydrotalcite to thereby form an oxide fired body, and then regenerating the fired body to LDH and removing excess moisture. The method of manufacture enables a simple and stable manufacture of a dense inorganic solid electrolyte 16.

1. Preparation of LDH Powder

An LDH powder is prepared that has the basic composition expressed by the general formula above: $[M^{2+}_{1-x}M^{3+}_{x}(OH)_2][A^{n-}_{x/n}\cdot mH_2O]$ (wherein $M^{2+}$ is a divalent cation, $M^{3+}$ is a trivalent cation, and $A^{n-}$ is an n-valent anion, n is an integer greater than or equal to 1, and x is 0.1 to 0.4). This type of LDH powder is commercially available, or is a starting material that is prepared by use of a known method such as a liquid phase synthesis method or the like that uses sulfate salts or chlorides.

Although there is no particular limitation on the particle diameter of the LDH powder, a volume reference D50 average particle diameter is preferably 0.1 μm to 1.0 μm, and more preferably 0.3 μm to 0.8 μm. When the particle diameter of the LDH powder is excessively fine, the powder aggregates and tends to cause residual pores during molding. An excessively large particle diameter of the LDH powder has an adverse effect on molding characteristics.

The LDH powder may be calcined into an oxide powder. The calcine temperature in that case may be set within a temperature range that does not greatly change the starting material particle diameter and, for example, is preferably less than or equal to 500 degrees C., and more preferably 380 degrees C. to 460 degrees C.

2. Preparation of Green Body

Next, the LDH powder is molded to form a green body. The molding step is preferably performed by pressure molding, for example, so that the relative density of the green body is 43% to 65%, more preferably 45% to 60%, and still more preferably 47% to 58%. The pressure molding may be performed by use of a known method such as a mold uniaxial press, cold isostatic pressurization (CIP), slip casting, or extrusion molding, or the like. However, when the LDH powder is calcined to form an oxide powder, there is a limitation to dry molding methods.

When the inorganic solid electrolyte 16 is imparted with a fuel permeation function by the use of the second method (method of provision of pores) as described above, the green body is formed by the addition of a pore-forming agent (for example, an acrylate polymer, methylcellulose or the like) to the LDH powder. Pores are formed in an inner portion of the oxide fired body by firing and removal of the pore-forming agent in a firing step as described below. The inner diameter, length and number of pores may be adjusted by the amount and the particle diameter of the pore-forming agent.

The relative density of the green body is calculated by using a theoretical density to divide the density that is calculated with reference to the weight and dimensions of the green body. Since the weight of the green body is affected by the adsorbed moisture, a unique value is preferably obtained by measuring a green body that is configured from an LDH powder that has been stored for greater than or equal to 24 hours at room temperature in a desiccator in a relative humidity of less than or equal to 20%, or by measuring the relative density of the green body after storage under the above conditions.

However, when the LDH powder is calcined to form an oxide powder, the relative density of the green body is preferably 26% to 40% and more preferably 29% to 36%. The relative density when using an oxide powder assumes that the respective metal elements that configure the LDH are converted into their respective oxides by calcining, and is calculated using a denominator that is calculated as a converted density of a mixture of each oxide.

3. Firing Step

Next, the green body is fired to form an oxide fired body. The firing step is preferably performed so that the oxide fired body has a weight that is 57% to 65% of the weight of the green body, and/or a volume that is 70% to 76% of the volume of the green body.

A configuration in which the weight of the oxide fired body is greater than or equal to 57% of the weight of the green body inhibits the formation of heterogeneous phases that are not regenerated during regeneration to LDH in subsequent steps. A configuration in which it is less than or equal to 65% of the weight of the green body enables the formation of a sufficient density in the following steps in response to sufficient firing. Furthermore, a configuration in which the volume of the oxide fired body is greater than or equal to 70% of the volume of the green body inhibits the formation of heterogeneous phases that are not regenerated during regeneration to LDH in subsequent steps, and inhibits the formation of cracks. A configuration when it is less than or equal to 76% of the volume of the green body enables the formation of a sufficient density in the following steps in response to sufficient firing.

However, when the LDH powder is calcined to form an oxide powder, it is preferred that firing is performed so that the oxide fired body has 85% to 95% of the weight of the green body and/or has a volume that is greater than or equal to 90% of the volume of the green body.

Also, irrespective of whether or not the LDH powder is calcined, the relative density of the oxide fired body is preferably configured to be 20% to 40%, more preferably 20% to 35%, and still more preferably 20% to 30% with reference to an oxide conversion. A relative density with reference to an oxide conversion is a relative density that assumes that the respective metal elements that configure the LDH are converted into their respective oxides by firing, and is obtained with reference to a denominator that is calculated as a converted density of a mixture of each oxide.

The firing temperature for the green body may be configured as 400 degrees C. to 850 degrees C., and is preferably 700 degrees C. to 800 degrees C. The firing step preferably includes a step in which the above firing temperature is maintained for greater than or equal to 1 hour, and preferably 3 to 10 hours. Furthermore, the rate of temperature increase to reach a firing temperature is preferably less than or equal to 100 degrees C./h, more preferably 5 degrees C./h to 75 degrees C./h, and still more preferably 10 degrees C./h to 50 degrees C./h in order to prevent fracturing of the green body that is caused by the emission of moisture or carbon dioxide due to a sharp temperature increase. Therefore, the total firing time from temperature increase to temperature decrease (less than or equal to 100 degrees C.) is preferably greater than or equal to 20 hours, more preferably 30 hours to 70 hours and still more preferably 35 hours to 65 hours.

When a pore-forming agent is added to the green body in the preparation step for the green body as described above, pores are formed in an inner portion of the oxide fired body by firing and removal of the pore-forming agent during the firing step.

4. Regeneration to LDH

Next, the oxide fired body is retained in or immediately above an aqueous solution that contains an n-valent anion (An) as described above and is regenerated to LDH to thereby obtain an LDH solidified body that is moisture rich. That is to say, the LDH solidified body that is manufactured by this method unavoidably contains excess moisture.

It is noted that the anions that are contained in the aqueous solution may be the same anions as the anions that are contained in the LDH powder, or may be a different type of anion.

The retention of the oxide fired body in the aqueous solution or immediately above the aqueous solution is preferably performed by a method of hydrothermal synthesis in a sealed vessel. An example of a sealed vessel includes a sealed vessel manufactured from TEFLON®, a polytetrafluoroethylene-based material. The outer side of the sealed vessel preferably includes provision of a jacket of stainless steel or the like.

LDH conversion is preferably performed by retaining the oxide fired body at greater than or equal to 20 degrees C. and less than 200 degrees C., and in a state of contact of at least one surface of the oxide fired body with the aqueous solution. A more preferred temperature is 50 degrees C. to 180 degrees C. and a still more preferred temperature is 100 degrees C. to 150 degrees C. The oxide fired body is preferably retained for greater than or equal to 1 hour at this LDH conversion temperature, more preferably retained at greater than or equal to 2 hours, and still more preferably retained at greater than or equal to 5 hours. In this manner, sufficient regeneration to LDH is promoted while inhibiting residual heterogeneous phases. It is noted that although no problems arise in the event that the retention time is excessively long, suitable settings are appropriate when efficiency is taken into account.

Ion exchanged water can be used when using carbon dioxide (carbonate ions) in the air as a type of anion for the aqueous solution that contains n-valent anions that are used in regeneration to LDH. It is noted that when performing hydrothermal synthesis in a sealed vessel, the oxide fired body may be immersed in the aqueous solution, or may be treated in a state in which a jig is used and at least one surface makes contact with the aqueous solution. When treatment is performed in a state of contact of at least one surface with the aqueous solution, since the excess moisture amount is lower when compared with total immersion, subsequent treatment steps may be performed in less time. However, since crack formation tends to occur when the amount of aqueous solution is excessively low, it is preferred that an amount of moisture is used that is equivalent to or greater than the weight of the fired body.

It is noted that when pores are formed in an inner portion of the oxide fired body, even after the regeneration step, there will be residual pores in an inner portion of the LDH solidified body.

4. Dehydration Step

Next, an inorganic solid electrolyte 16 is obtained by removal of excess moisture from the LDH solidified body. The step of removal of excess moisture is preferably performed at less than or equal to 300 degrees C., and in an environment of greater than or equal to 25% of the estimated relative humidity at the maximum temperature of the removal step. When performing dehydration at a temperature that is higher than room temperature, it is preferred to re-enclose in the sealed vessel used in the LDH regeneration step in order to prevent rapid vaporization of the moisture from the LDH solidified body. The preferred temperature at that time is 50 degrees C. to 250 degrees C., with a temperature of 100 degrees C. to 200 degrees C. being more preferred. Furthermore, the more preferred relative humidity during dehydration is 25% to 70%, with 40% to 60% being still more preferred. Dehydration may be performed at room temperature and the relative humidity at that time may be configured to fall within a range of 40% to 70% of a normal indoor environment.

When the inorganic solid electrolyte 16 is imparted with a fuel permeation function by means of the first method described above (method of providing through holes), the through holes are directly formed in the inorganic solid electrolyte 16 after removal of excess moisture. The through holes may be formed by using a laser to open holes in the thickness direction of the inorganic solid electrolyte 16. The inner diameter of the through holes may be adjusted by varying the output of the laser or the irradiation time.

EXAMPLES

Although the examples of the present invention will be described below, the present invention is not thereby limited to the following examples.

Preparation Solid Alkaline Fuel Cell 10

(1) Preparation of Inorganic Solid Electrolyte 16

Firstly, a starting material powder was prepared as a hydrotalcite powder (DHT—4H manufactured by Kyowa Chemical Industry Co., Ltd.) that is a commercially-available layered double hydroxide. The composition of the starting material powder was $Mg^{2+}_{0.68}Al^{3+}_{0.32}(OH)_2 CO_3^{2-}_{0.16} \cdot mH_2O$. A disc-shaped die having a diameter of 20 mm was filled with the starting material powder and uniaxial press molding was performed at a molding pressure of 500 kgf/cm$^2$ to thereby obtain a green body exhibiting 53% relative density, 20 mm diameter and an approximate thickness of 0.8 mm. The measurement of the relative density was performed on a green body after storage for 24 hours at room temperature in a relative humidity of less than or equal to 20%.

Next, the resulting green body was fired in an alumina sheath. Temperature increase during firing had a rate of less than or equal to 100 degrees C./h in order to prevent fracturing of the green body caused by the emission of moisture or carbon dioxide due to a sharp temperature increase. Then after reaching a maximum temperature of 750 degrees C., it was retained for 5 hours and allowed to cool. The total firing time from temperature increase to temperature decrease (less than or equal to 100 degrees C.) was 62 hours.

Next, the fired body was placed in a sealed vessel manufactured from TEFLON® provided with an outer jacket of stainless steel and sealed together with ion exchange water in air. After performing hydrothermal synthesis on the fired body under regeneration conditions for a retention period of 5 hours at 100 degrees C., polishing was performed to a thickness of 0.3 mm and moisture on the fired body surface was wiped using filtration paper. In this manner, the inorganic solid electrolyte 16 was formed by natural dehydration (drying) indoors of the resulting fired body at 25 degrees C. and a relative humidity of 50%.

Next, in Examples 1 to 9 and Comparative Examples 2 and 3, through holes oriented in a thickness direction were formed in the inorganic solid electrolyte 16 by use of a laser. In that configuration, the fuel amount that permeates the inorganic solid electrolyte 16 was adjusted by controlling the laser output and the irradiation time to thereby adjust the inner diameter of the through holes. In this manner, as shown in Table 1, it was possible to vary the water in each sample per unit surface area in the cathode-side surface 16S of the inorganic solid electrolyte 16.

It is noted that the water permeation amount per unit surface area of the cathode-side surface 16S in the inorganic solid electrolyte 16 is measured in the following manner. Firstly, water vapor at 22 kPa and 62 degrees C. is supplied to the anode-side surface 16T of the inorganic solid electrolyte 16 while circulating nitrogen gas that does not contain water onto the cathode-side surface 16S. Then, the total amount of nitrogen gas (including water vapor) that has permeated the cathode-side surface 16S is recovered and cooled to 0 degrees C. to thereby separate the water vapor contained in the nitrogen gas as liquid water. The mass of the separated water is divided by the test time and the surface area of the cathode-side surface 16S to thereby calculate the water permeation amount per unit surface area of the cathode-side surface 16S.

2. Preparation of Cathode 12 and Anode 14

A platinum-supporting carbon having a Pt support amount of 50 wt % (TEC10E50E manufactured by Tanaka Kikinzoku Kogyo) (referred to below as "Pt/C") and PVDF powder as a binder (referred to below as "PVDF binder") were prepared. A cathode paste was prepared by mixing Pt/C, the PVDF binder and water into a paste so that the weight ratio of (Pt/C catalyst):(PVDF binder):(water) coincided with a ratio of 9 wt %:0.9 wt %:90 wt %.

In addition, a platinum/ruthenium-supporting carbon having a Pt—Ru support amount of 54 wt % (TEC61E54 manufactured by Tanaka Kikinzoku Kogyo) (referred to below as "Pt—Ru/C") and PVDF binder were prepared. An anode paste was prepared by mixing Pt—Ru/C, the PVDF binder and water into a paste so that the weight ratio of (Pt—Ru/C catalyst):(PVDF binder):(water) coincided with a ratio of 9 wt %:0.9 wt %:90 wt %.

Next, the cathode paste was printed onto one surface of the inorganic solid electrolyte 16 and the anode paste was printed onto the other surface of the inorganic solid electrolyte 16. Then a conjugate of the cathode 12/inorganic solid electrolyte 16/anode 14 was formed by thermal treatment for 4 hours at a temperature of 180 degrees C. in $N_2$.

(3) Assembly of Solid Alkaline Fuel Cell 10

Figure 2:
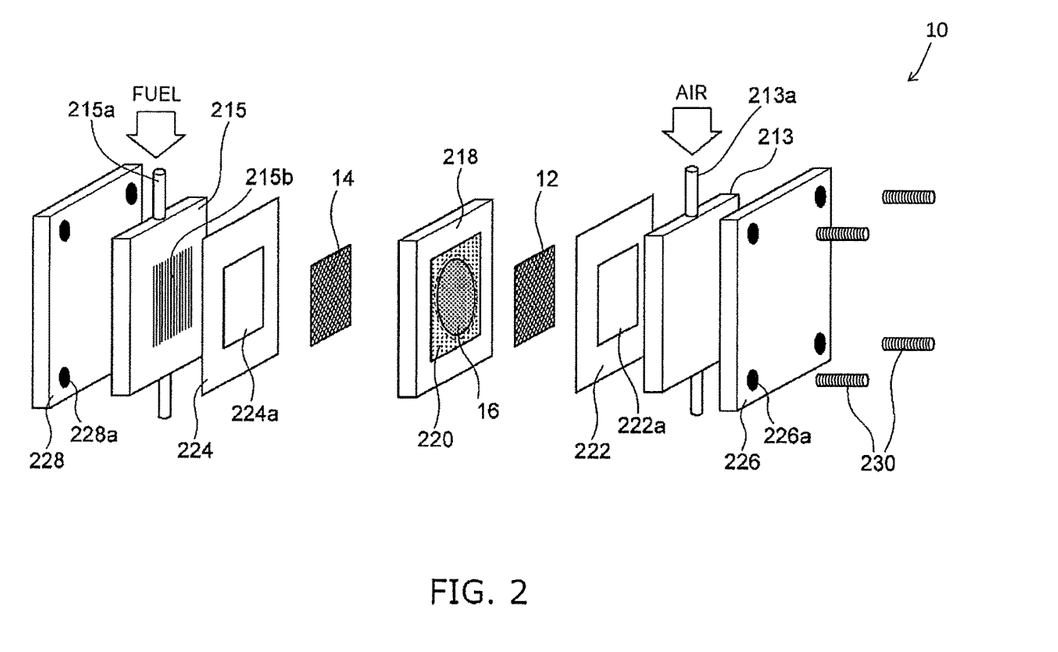
FIG. 2 is an exploded perspective view illustrating a solid alkaline fuel cell according to an Example.

FIG. 2 is an exploded perspective view illustrating the solid alkaline fuel cell 10 that was prepared according to an Example.

Firstly, the inorganic solid electrolyte 16 was fitted to a circular opening (diameter 20 mm) of an electrolyte fixing jig 218 and fixed by use of PTFE tape 220 that is provided with a circular opening 220a having a diameter of 19 mm formed a central portion. It is noted that although the cathode 12 and the anode 14 were printed onto both surfaces of the inorganic solid electrolyte 16, FIG. 2 illustrates a configuration in which there is separation from the inorganic solid electrolyte 16.

Next, a gasket 222 (made of PTFE) formed with an opening 222a, an air supply member 213 (made of carbon) for supply of humidified air and a current collecting plate 226 (made of gold plated copper) were stacked onto the cathode 12 side of the stacked body formed from the anode 14/inorganic solid electrolyte 16/cathode 12. The air supply member 213 is provided with a passage 213a for allowing the flow of humidified air and a slit (not shown) for the supply of the humidified air to the cathode 12.

Next, a gasket 224 (made of PTFE) formed with an opening 224a, a fuel supply member 215 (made of carbon) for the supply of fuel and a current collecting plate 228 (made of gold plated copper) were stacked onto the anode 14 side of the stacked body formed from the anode 14/inorganic solid electrolyte 16/cathode 12. The fuel supply member 215 is provided with a passage 215a for allowing the flow of fuel and a slit 215b for the supply of the fuel to the anode.

The stacked body described above was finished by threadable attachment of screws 230 that were inserted into screw holes 226a, 228a formed in the four corners of the two current collecting plates 226, 228 to thereby complete the solid alkaline fuel cell 10.

Operational Testing of Solid Alkaline Fuel Cell 10

Firstly, the solid alkaline fuel cell 10 was heated to 120 degrees C.

Next, a compressor was used to supply the air supply member 213 with dry air at less than or equal to the dew point of 0 degrees C., and adjusted so that the air utilization ratio at the cathode 12 was 50%. Furthermore, gaseous methanol was supplied to the fuel supply member 215 and adjusted so that the fuel utilization ratio at the anode 14 was 50%. The fuel pressure supplied to the anode 14 was adjusted to be greater than the air pressure supplied to the cathode 12 by use of a discharge pressure adjustment valve (not shown) that was mounted onto the respective discharge passages for the air supply member 213 and the fuel supply member 215.

Then, the output of the solid alkaline fuel cell 10 was measured while generating power at a rated load (0.3 A/cm$^2$). The output of the solid alkaline fuel cell 10 is a value that is standardized by taking as 100% at which the water amount required for power generation at the rated load has been provided in a gaseous state. In Table 1, ⊚ denotes an evaluation in which the output of the solid alkaline fuel cell 10 is greater than or equal to 95% of the maximum output, ○ denotes an evaluation in which it is greater than or equal to 90% and less than 95%, Δ denotes an evaluation in which it is greater than or equal to 80% and less than 90%, and X denotes an evaluation in which it is less than 80%.

TABLE 1

| | Water Permeation Amount per Unit Surface Area of Cathode-side Surface of Inorganic Solid Electrolyte ($\mu$g/min · cm$^2$) | Rated Load (0.3A/cm$^2$) |
|---|---|---|
| Example 1 | 80 | Δ |
| Example 2 | 320 | ○ |
| Example 3 | 600.0 | ○ |
| Example 4 | 1000.0 | ○ |
| Example 5 | 1300.0 | ⊚ |
| Example 6 | 3000.0 | ⊚ |
| Example 7 | 4000.0 | ⊚ |
| Example 8 | 5000.0 | ○ |
| Example 9 | 5400.0 | Δ |
| Comparative Example 1 | N.D. (less than or equal to lower limit of detection) | X |
| Comparative Example 2 | 50 | X |
| Comparative Example 3 | 6500 | X |

As shown by Table 1, in Comparative Example 1 in which through holes were not formed in the inorganic solid electrolyte 16 and in Comparative Example 2 in which the water permeation amount per unit surface area was 50 $\mu$g/mm·cm$^2$, the output of the solid alkaline fuel cell 10 at the rated load was less than 80% of the maximum output. The reason for this result is considered to be that a sufficient water amount was not supplied to the cathode 12. Furthermore, in Comparative Example 3 in which the water permeation amount per unit surface area was 6500 $\mu$g/min·cm$^2$, the output of the solid alkaline fuel cell 10 at the rated load was less than 80% of the maximum output. The reason for this result is considered to be the adverse effect on the characteristics of the inorganic solid electrolyte 16 itself due to the fact that the ratio occupied by the through holes relative to the inorganic solid electrolyte 16 was large.

On the other hand, in Examples 1 to 9 in which the water permeation amount per unit surface area was greater than or equal to 80 $\mu$g/min·cm$^2$ and less than or equal to 5400 $\mu$g/min·cm$^2$, the output of the solid alkaline fuel cell 10 at the rated load was greater than or equal to 80% of the maximum output. In particular, in Examples 2 to 8 in which the water permeation amount per unit surface area was greater than or equal to 320 $\mu$g/min·cm$^2$ and less than or equal to 5400 $\mu$g/min·cm$^2$ per unit surface area, the output of the solid alkaline fuel cell 10 at the rated load was greater than or equal to 90% of the maximum output. Furthermore, in Examples 7 to 9 in which the water permeation amount per unit surface area was greater than or equal to 1300 $\mu$g/min·cm$^2$ and less than or equal to 4000 $\mu$g/min·cm$^2$ per unit surface area, the output of the solid alkaline fuel cell 10 at the rated load was greater than or equal to 95% of the maximum output.

The invention claimed is:

1. A solid alkaline fuel cell comprising:
   a cathode supplied with an oxidant which contains oxygen,
   an anode that is supplied with a fuel which contains hydrogen atoms, and
   an inorganic solid electrolyte disposed between the anode and the cathode, the inorganic solid electrolyte exhibiting hydroxide ion conductivity, wherein
   the inorganic solid electrolyte enables permeation of water of greater than or equal to 80 $\mu$g/min·cm$^2$ and less than or equal to 5400 $\mu$g/min·cm$^2$ per unit surface area of a cathode-side surface when the permeation of water is measured as water vapor at 22 kPa.

2. The solid alkaline fuel cell according to claim 1, wherein
   the inorganic solid electrolyte enables permeation of water of greater than or equal to 320 $\mu$g/min·cm$^2$ per unit surface area of the cathode-side surface when the permeation of water is measured as water vapor at 22 kPa.

3. The solid alkaline fuel cell according to claim 1, wherein
   the inorganic solid electrolyte enables permeation of water of greater than or equal to 1300 $\mu$g/min·cm$^2$ per unit surface area of the cathode-side surface when the permeation of water is measured as water vapor at 22 kPa.

* * * * *